(12) United States Patent
Gupta et al.

(10) Patent No.: US 11,093,471 B2
(45) Date of Patent: Aug. 17, 2021

(54) LARGE RANGE LOOKUPS FOR $B^\varepsilon$-TREE

(71) Applicant: VMware, Inc., Palo Alto, CA (US)

(72) Inventors: Abhishek Gupta, Sunnyvale, CA (US);
Richard P. Spillane, Mountain View, CA (US); Robert T. Johnson, Palo Alto, CA (US); Wenguang Wang, Santa Clara, CA (US); Kapil Chowksey, Cupertino, CA (US); Jorge Guerra Delgado, Fremont, CA (US); Sandeep Rangaswamy, Mountain View, CA (US); Srinath Premachandran, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 555 days.

(21) Appl. No.: 16/000,142

(22) Filed: Jun. 5, 2018

(65) Prior Publication Data
US 2019/0370239 A1    Dec. 5, 2019

(51) Int. Cl.
*G06F 17/00* (2019.01)
*G06F 16/22* (2019.01)
*G06F 7/16* (2006.01)

(52) U.S. Cl.
CPC ............ *G06F 16/2246* (2019.01); *G06F 7/16* (2013.01)

(58) Field of Classification Search
CPC .................................................. G06F 16/2246
See application file for complete search history.

(56) References Cited

U.S. PATENT DOCUMENTS

2008/0307181 A1* 12/2008 Kuszmaul ........... G06F 16/2272
                                                      711/164
2016/0283479 A1*  9/2016 Xiao .................. G06F 16/24552

OTHER PUBLICATIONS

Bender et al., An Introduction to B/\Epsilon-tree and Write-Optimization. Oct. 2015.*

* cited by examiner

*Primary Examiner* — Tuankhanh D Phan
(74) *Attorney, Agent, or Firm* — Patterson + Sheridan, LLP

(57) ABSTRACT

Embodiments herein are directed towards systems and methods for performing range lookups in $B^\varepsilon$-trees. One example method involves receiving a request to return key-value pairs within a range of keys from the $B^\varepsilon$-tree. The $B^\varepsilon$-tree includes a plurality of nodes, each node being associated with a buffer that stores key-value pairs. The method further involves determining a fractional size of the range of keys. The method further involves, for each level of the $B^\varepsilon$-tree, obtaining from within one or more buffers of one or more nodes of the level, a set of key-value pairs within the range of keys up to a size equal to the fractional size and transferring the set of key-value pairs to a result data structure. The method further involves sorting and merging all key-value pairs in the result data structure and returning the result data structure in response to the request.

20 Claims, 6 Drawing Sheets

LARGE RANGE LOOKUPS FOR B$^\varepsilon$-TREE

BACKGROUND

B-trees are frequently used in various storage or database systems as a method and structure of storing data. Such storage systems may include one or more physical or virtual devices, including conventional hard disk drives of a computing device, Storage Area Network (SAN) devices or Virtual Storage Area Network (vSAN) devices. B-trees feature a balancing tree structure where inserted data is sorted during insertion. B-trees typically include a set of nodes each containing one or more key-value pairs. A key is an identifier of data, and a value is either the data itself or a pointer to a location (e.g., in memory or on disk) of the data associated with the identifier. Accordingly, a B-tree may be sorted according to the keys of the key-value pairs, and data can be read/written from the tree based on the key associated with the data. Because B-trees contain sorted key-value pairs, a read operation such as a query (e.g., a request for the value associated with a particular key in a data structure) to a B-tree may be completed by traversing the B-tree relatively quickly to find the desired key-value pair based on the key of the query. Thus, B-trees can be used to store data in a way that improves performance relative to other data structures (such as arrays) for certain operations (e.g., a query to an un-sorted array may take longer than a query to a B-tree).

B$^\varepsilon$-trees are a modification of B-trees and are similar in many respects to B-trees. Unlike a B-tree, however, each node of a B$^\varepsilon$-tree, except the leaf nodes, includes, in addition to key-value pairs, a buffer. The buffers of a B$^\varepsilon$-tree may store operations to be performed on the B$^\varepsilon$-tree as messages. For example, a message may indicate a key and a write or update operation (e.g., set the value, add, subtract, multiply, delete, change, etc.) to perform on the value associated with the key in a key-value pair. Accordingly, a message may also be considered a type of key-value pair with the value being the operation to perform on a value of another key-value pair with the same key. The buffers may be used to store messages until a size limit is reached, at which point the messages may be flushed to child nodes and applied to key-value pairs in the child nodes (e.g., by performing a merge or compaction), which may include adding new nodes to the B$^\varepsilon$-tree or balancing the B$^\varepsilon$-tree by transferring nodes from one subtree to another. The buffers of B$^\varepsilon$-trees allow write operations to be performed more quickly relative to standard B-trees, as write operations on existing key-value pairs or insertions of new key-value pairs may not traverse the entire B$^\varepsilon$-tree to be applied immediately and may instead be placed in a buffer of any node associated with the key of the message, possibly near the root of the B$^\varepsilon$-tree.

Although a B$^\varepsilon$-tree may be more efficient than a standard B-tree for write operations, read operations may be less efficient when performed on a B$^\varepsilon$-tree. For example, two types of queries are often performed on B-trees and B$^\varepsilon$-trees: point lookups, which request a particular key-value pair of the tree based on a single key, and range lookups, which request a range of key-value pairs of the tree based on a range of keys (e.g., all keys from one to ten that are present in the tree). Range lookups of large ranges of keys using a full traversal method typically used for B-tree lookups may be less efficient when performed on a B$^\varepsilon$-tree (especially in large B$^\varepsilon$-trees).

In particular, as discussed, the B$^\varepsilon$-tree may include multiple key-value pairs associated with the same key as there may be messages associated with a key in one or more buffers associated with the B$^\varepsilon$-tree. The messages may need to be merged with the key-value pair associated with the key in the tree portion (i.e., not in a buffer) of the B$^\varepsilon$-tree. For example, many messages may be stored in one or more buffers with the same key for application to a key-value pair. The messages may be merged with the key-value pair to get the resulting value associated with the key. Therefore, for each key in the range of keys, any buffers associated with the key may need to be fully traversed to find any key-value pairs associated with the key and then all the key-value pairs found may need to be merged to get the resulting value associated with the key based on a query.

Such a full traversal of a B$^\varepsilon$-tree conventionally involves copying each buffer of the B$^\varepsilon$-tree into memory to identify all messages having keys within the range, which may consume significant processing resources in addition to occupying large amount of memory. For some computing systems, there may be insufficient system memory to perform such an operation. Thus, methods of performing range lookups on B$^\varepsilon$-trees are needed that use less memory and less processing resources.

DETAILED DESCRIPTION

Embodiments presented herein relate to systems and methods for performing range lookups on B$^\varepsilon$-trees. An example method of performing a range lookup for a range of keys on a B$^\varepsilon$-tree may generally include transferring key-value pairs associated with a fractional subset of the range of keys (e.g., a fractional subset based on a number of iterations to be used for transferring, based on available memory, etc.) from each level of the B$^\varepsilon$-tree (e.g., from the buffer(s) associated with the node(s) associated with the fractional subset of the range of keys at each level) to a second data structure. The second data structure may be any suitable data structure, such as a single array, multiple arrays (e.g., one for each level of the B$^\varepsilon$-tree), a B-tree, etc.

Each of the key-value pairs of the fractional subset of keys transferred to the second data structure may be merged into the second data structure in a searchable order. For example, if the second data structure includes one or more arrays, then a merge-sort may be performed on the second data structure. If the second data structure is a B-tree, then merging of key-value pairs may be performed as the key-value pairs are transferred into the B-tree. A range lookup for the fractional subset of the range of keys may then be performed on the second data structure.

Such a method may produce a range of keys for the B$^\varepsilon$-tree in less time, using less processing and memory resources than a typical range lookup performed on the B$^\varepsilon$-tree.

Figure 1:
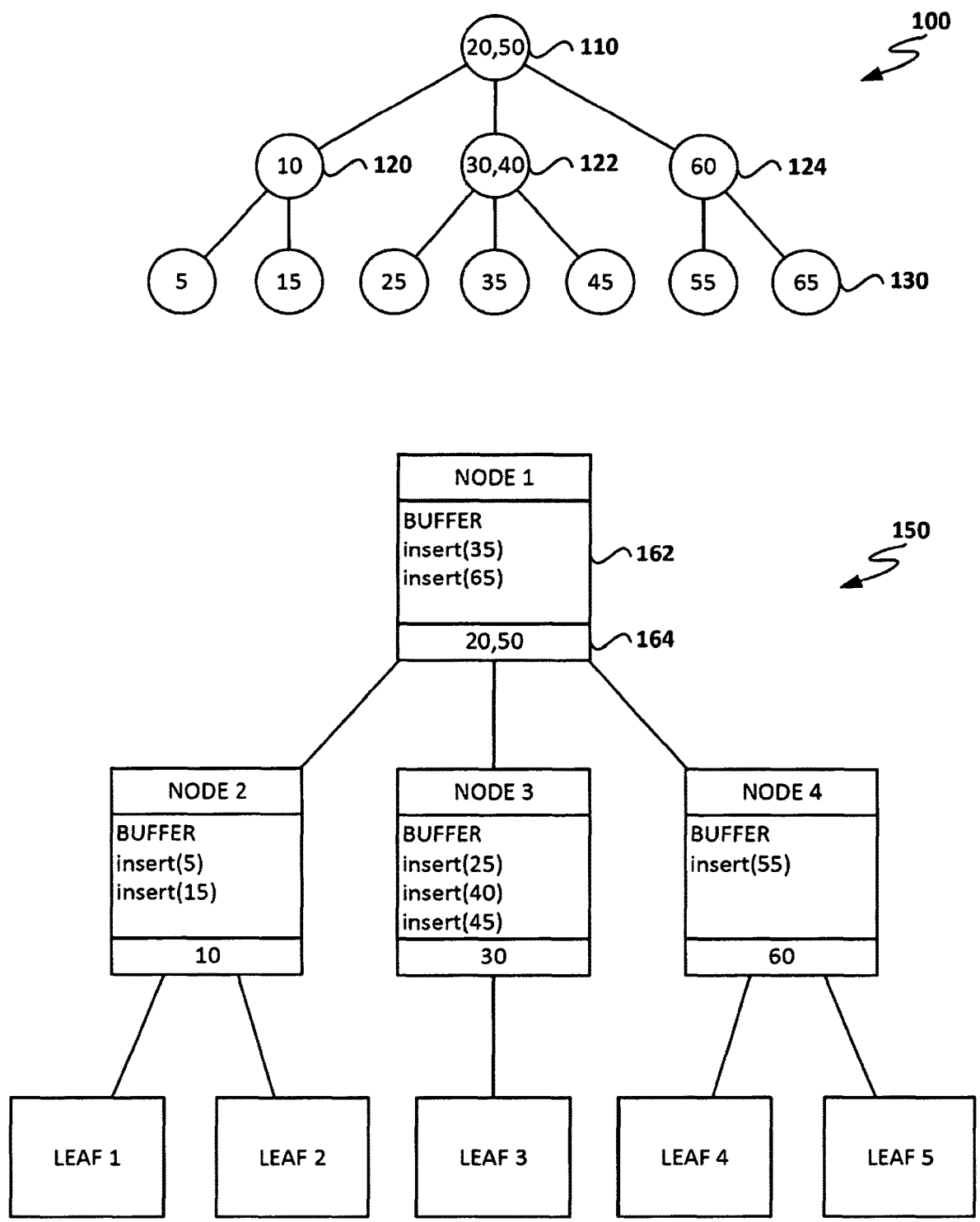
FIG. 1 is a block diagram of an example B$^\varepsilon$-tree.

FIG. 1 is a block diagram of an example B-tree 100 and a B$^\varepsilon$-tree 150, each storing the same data. As illustrated, B-tree 100 includes a plurality of nodes connected in a branching tree structure. Each node has one parent but may have many children. The top node of a B-tree is root node 110, which has no parent node. The middle level of B-tree 100 are branch nodes which have both parent and child nodes, including branch nodes 120-124. B-tree 100 has only three levels, and thus only a single branch level, but other B-trees may have more branch levels and total levels. The bottom level of B-tree 100 is comprised of leaf nodes with no children, including leaf node 130.

Each node of B-tree 100 stores at least one key-value pair. For example, leaf node 130 stores the key-value pair corresponding to the key "65." The leaf nodes in B-tree 100 each store a single key-value pair but an individual node may store additional key-value pairs. For branch and root nodes of B-tree 100, key-value pairs may store values. Key-value pairs in branch and root nodes may also store pointers to child nodes, which can be used to locate a given key-value pair that is stored in a child node. For example, root node 110 includes two key-value pairs, "20" and "50". These key-value pairs indicate that key-value pairs with keys less than "20" can be found by accessing branch node 120, key-value pairs with keys greater than "20" but less than "50" can be found by accessing branch node 122, and key-value pairs with keys greater than "50" can be found by accessing branch node 124. In total, B-tree 100 has eleven nodes and a height of three. The height of a tree is the number of levels of nodes contained in the tree.

Both B-trees and $B^\epsilon$-trees may be subdivided into subtrees. A subtree typically includes part of the complete set of nodes of a tree and includes a subtree root. For example, in B-tree 100, a subtree may be defined with branch node 120 as the subtree root, and include the child nodes of branch node 120.

$B^\epsilon$-tree 150 stores the same data as stored in B-tree 100, in a different format. $B^\epsilon$-tree 150 includes nodes 1-4. Nodes of $B^\epsilon$-tree 150 include, similarly to the nodes of B-tree 100, key-value pairs. For example, data section 164 of node 1 includes the key-value pairs of key "20" and key "50". Like B-tree 100, these key-value pairs may store data as well as pointers to which child nodes to access in order to find other key-value pairs within $B^\epsilon$-tree 150.

In addition to the key-value pairs, non-leaf nodes of $B^\epsilon$-tree 150 also include a buffer that stores messages. $B^\epsilon$-tree 150 includes, as shown, 4 non-leaf nodes and 5 leaf nodes. Leaf nodes of a $B^\epsilon$-tree do not include a buffer or store messages, unlike other nodes of the $B^\epsilon$-tree.

A buffer of a $B^\epsilon$-tree is typically a data structure capable of ordered or sorted storage. For example, a buffer may be a binary tree structure such as a red-black tree or a B-tree, or an array or a set of nested arrays. Messages generally indicate a write operation to be performed on $B^\epsilon$-tree 150, such as inserting a key-value pair, deleting a key-value pair, or modifying a key-value pair. The message itself may be a key-value pair and have as its key, the key of the key-value pair on which the operation is to be performed, and as its value the operation to be performed on the key-value pair (e.g., add 3 to value, set value to 5, subtract 6 from value, delete key-value pair, insert key-value pair of key X and value Y, etc.). For example, an insert operation may be sent to $B^\epsilon$-tree 100 to add a new key-value pair. Such an insert operation may be added to the buffer of the root node as an insert message. The insert message includes the details of which key-value pair has been added. Messages may also include a timestamp indicating when a message was received at the buffer. In certain embodiments, messages may be ordered in the buffer, such as in an order of arrival into the buffer. In such embodiments, a timestamp may not be needed to indicate when the message was received at the buffer. Further, messages in the buffer may be ordered by key.

Buffer 162 of node 1 includes two insert messages, "insert(35)" and "insert(65)". The two messages each include a key-value pair, with the key of the key-value pair expressed numerically. For example, insert(35) may correspond to a message with a key 35 and value to insert a key-value pair with key 35 and a corresponding value. At some time, such as when a buffer is filled, messages are flushed from the buffer down to child nodes. In this case, when buffer 162 is full, message "insert(35)" is flushed to node 3, and message "insert(65)" is flushed to node 4 (not shown). Child nodes may need to be created to accommodate flushing of messages. Flushing message "insert(35)" to node 3 may cause the buffer of node 3 to be full. If so, child nodes (e.g., 3 child nodes) may be added to node 3. These new nodes would store the key-value pairs specified in the messages stored in the buffer of node 3.

It may be possible for multiple messages concerning a particular key-value pair to be within the $B^\epsilon$-tree at one or more levels. If so, timestamps associated with each message may be utilized to determine a correct order for the messages at each level, and messages at higher levels may be newer than messages at lower levels. The correct ordering of messages may be used to determine the correct value associated with the key based on applying the messages in the correct order. For example, an insert message for a key may have been followed by a modification message and both stored in one or more buffers. A later timestamp associated with the modification message may be used to determine the correct value for the key-value pair is the value indicated in the insert message as modified according to the modification message. Alternatively, if the messages are sorted by order in buffers, then the order in the buffer, as opposed to a timestamp, may be used to order the messages.

Performing a range lookup on a B-tree, such as B-tree 100 typically involves performing a full traversal of the B-tree until all keys requested in the range are located. Such a full traversal may be an inefficient method of performing range lookups for $B^\epsilon$-trees due to each key potentially having associated key-value pairs at multiple levels (e.g., in buffers and/or a data sections of a node) of the $B^\epsilon$-tree as discussed. For large $B^\epsilon$-trees or large range lookups such a process may require more memory resources than are available. The systems and methods described herein perform memory-efficient large range lookups on $B^\epsilon$-trees.

Figure 2:
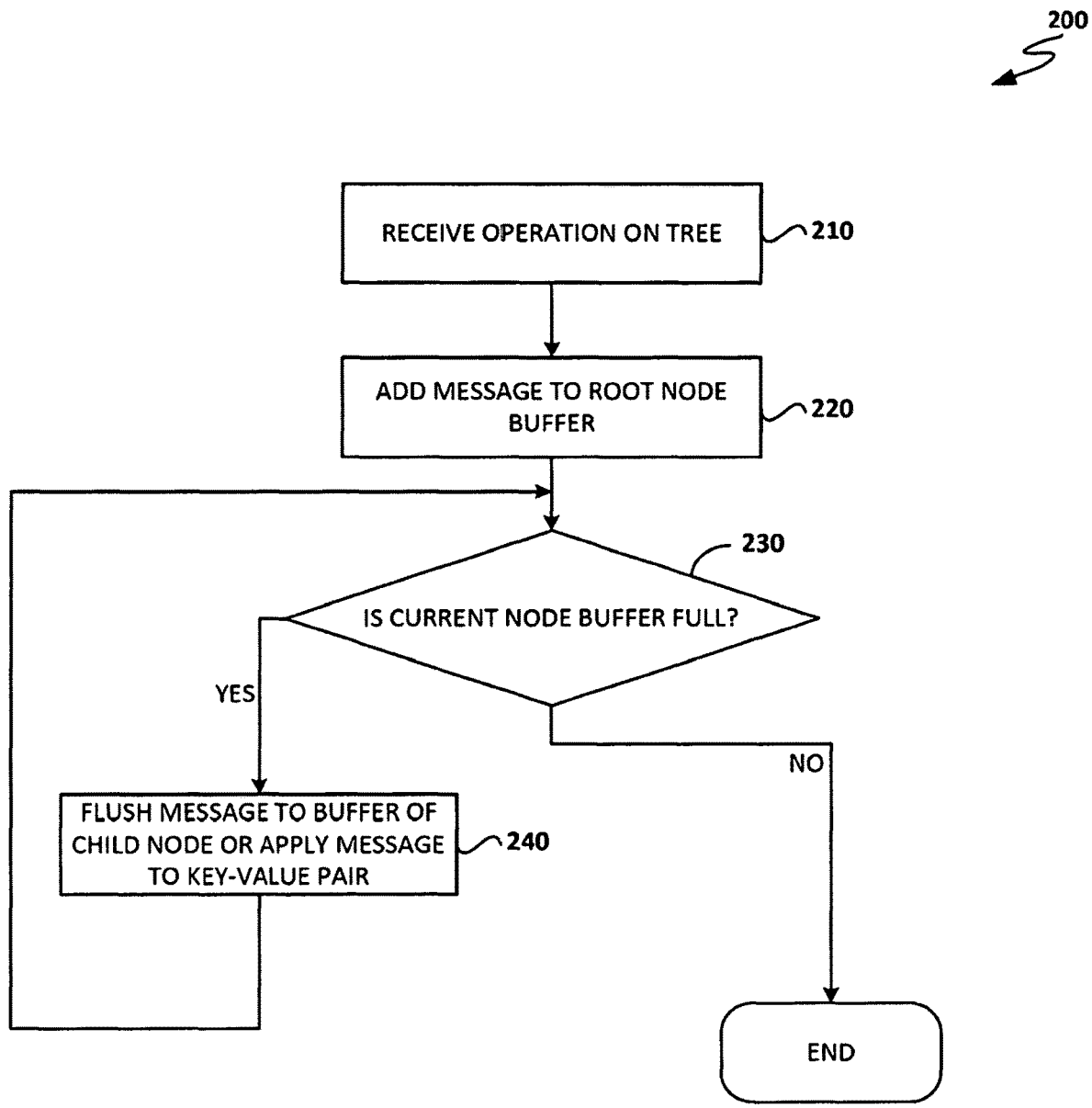
FIG. 2 depicts a flow diagram of example operations performed on a B$^\varepsilon$-tree.

FIG. 2 depicts a flow diagram of example operations 200 performed on a $B^\epsilon$-tree, such as $B^\epsilon$-trees 150 of FIG. 1. As shown, at 210, an operation to perform on the $B^\epsilon$-tree is received. Apart from queries, operations performed on a tree typically include write operations, such as insertions, modifications, or deletions of data in the $B^\epsilon$-tree.

At 220, the operation is stored as a message in the root node's buffer. Further a current node for operations 200 is set as the root node. At 230, it is determined if a buffer of a current node of the $B^\epsilon$-tree is full. In general, operations, such as write operations, on a $B^\epsilon$-tree are stored as messages in a buffer of a node (e.g., root node or child node) until the buffer is full. If the current node buffer is full, operations 200 proceed to 240. If the current node buffer is not full, operations 200 end.

At 240, messages stored in the current node buffer are flushed to child nodes of the current node or applied to the tree, such as to a key-value pair in the current node corresponding to the message if the key-value pair is in the current node. Flushing does not require that the operations of all messages are actually performed on the $B^\varepsilon$-tree (i.e., on the corresponding key-value pairs associated with the keys of the messages). For example, a message may only be passed down the $B^\varepsilon$-tree to a node closer to the node storing in its data section the key-value pair associated with the key of the message. In a $B^\varepsilon$-tree, like a B-tree, a node may be split when it becomes full. Typically, a B-tree has a maximum number of child nodes per node, so an insertion specifying an additional insertion results in the children of the node being divided into two new nodes. The current node is then set to the child node the message is flushed to and operations 200 return to 230.

Figure 3:
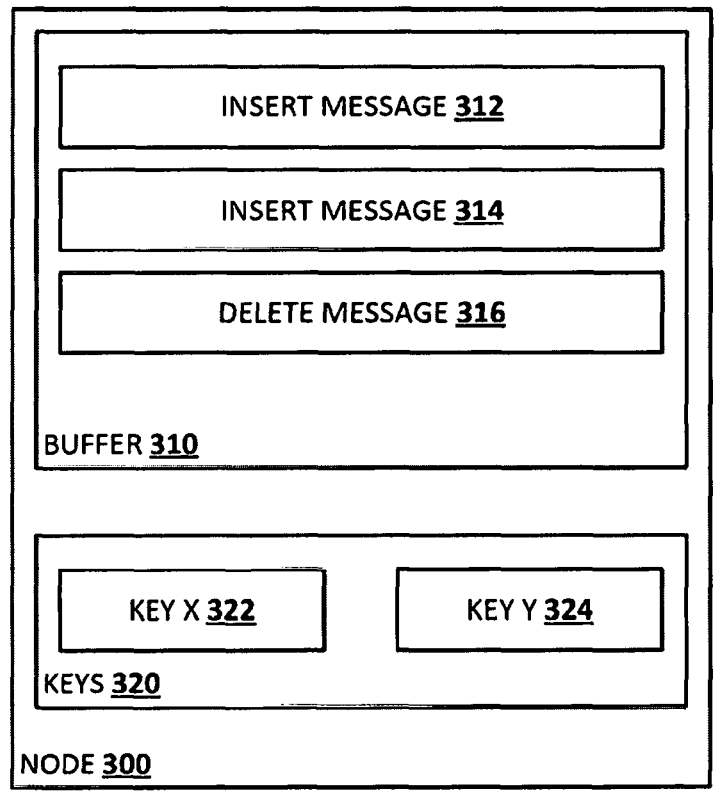
FIG. 3 is a block diagram of an example node of a B$^\varepsilon$-tree.

FIG. 3 is a block diagram of an example non-leaf node 300 of a $B^\varepsilon$-tree. Node 300 includes buffer 310 and keys 320. Buffer 310 stores a plurality of messages containing operations to be performed on the $B^\varepsilon$-tree as well as any information associated with those operations. In this example, buffer 310 includes two insert messages 312-314 and delete message 316. Each insert message includes a key-value pair to be inserted into the $B^\varepsilon$-tree. Delete message 316 specifies a key-value pair in the $B^\varepsilon$-tree that should be removed. If delete message 316 is detected during a traversal of the $B^\varepsilon$-tree, search for the corresponding key-value pair may cease as the key-value pair is no longer technically in the $B^\varepsilon$-tree, even if the value corresponding to that key-value pair is still present on a storage device containing the $B^\varepsilon$-tree.

Keys 320 are a set of keys corresponding to values. For root and branch nodes, keys 320 may be pivot keys, which correspond to a key-value pair with a child pointer as the value. A child pointer indicates a spot in memory storing a particular child node. Pivot keys can thus be used to determine which child nodes of node 300 should be accessed in order to locate a given key. Key X 322 and Key Y 324 are included in keys 320. Generally key X 322 and key Y 324 indicate that key-value pairs with keys less than X can be found in a first child of node 300 (or in a subtree rooted at the first child), that key-value pairs with keys greater than X and less than Y can be found in a second child of node 300, and that key-value pairs with keys greater than Y can be found in a third child of node 300. In this example, node 300 has two keys and three children, but in other examples, node 300 may have more children. If so, node 300 may have one less the number of keys than the number of children.

Generally, a node of the $B^\varepsilon$-tree, such as node 300, receives messages and stores the messages in a buffer. Apart from the root node of the $B^\varepsilon$-tree, nodes receive messages from a parent node, when a message is flushed to the node from the parent node. In some cases, messages are flushed from a parent node when a buffer of the parent node is filled. Because messages each contain a complete key-value pair, each node may store a plurality of key value pairs.

Figure 4:
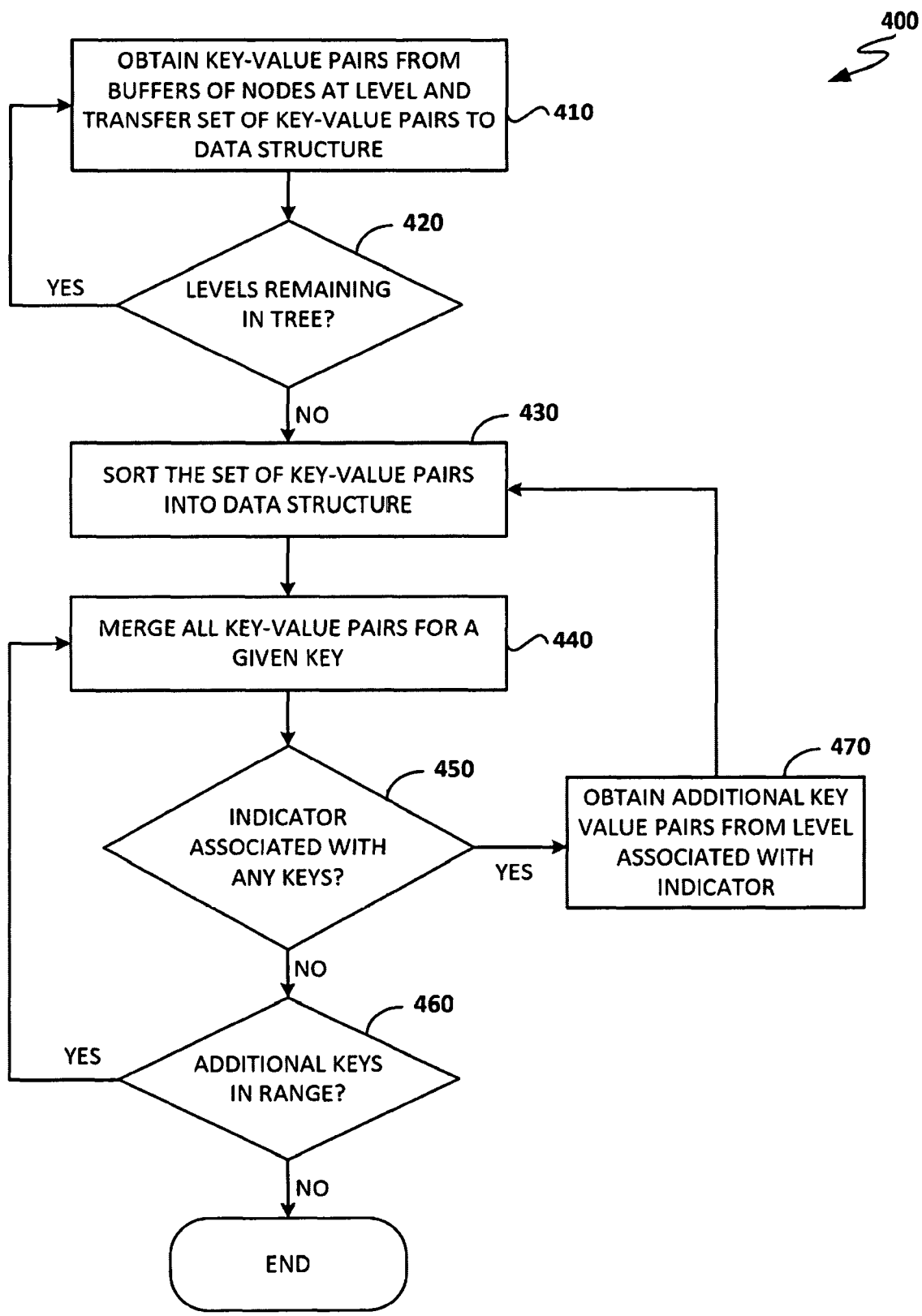
FIG. 4 depicts a flow diagram of example operations for performing a range lookup on a B$^\varepsilon$-tree.
Figure 5:
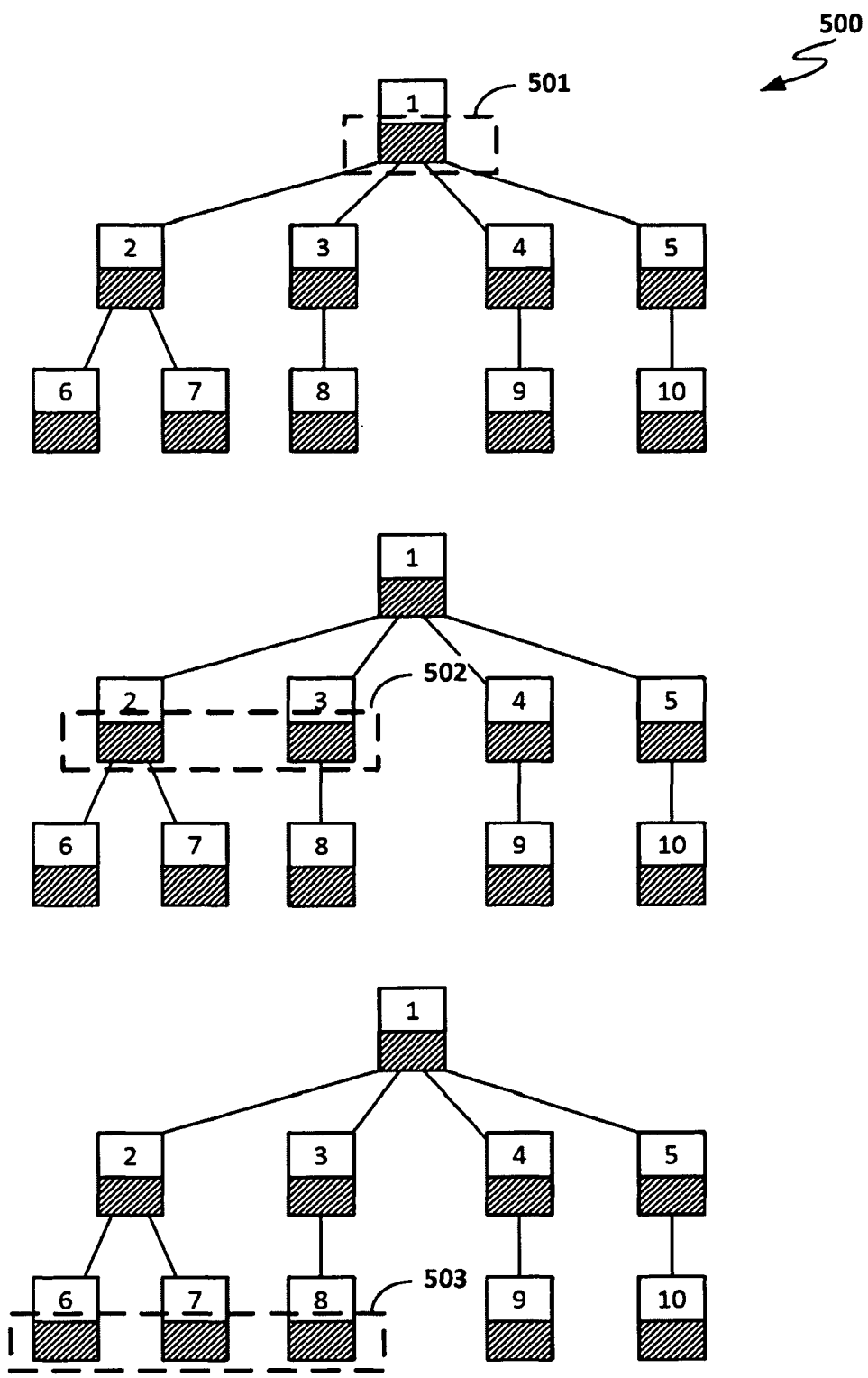
FIG. 5 is a block diagram depicting a range lookup performed on a B$^\varepsilon$-tree.

FIG. 4 depicts a flow diagram of example operations 400 for performing a range lookup on a $B^\varepsilon$-tree. FIG. 5 illustrates operations 400 as performed on an example $B^\varepsilon$-tree. Prior to operations 400 a request to return key-value pairs within a range of keys from a tree may have been received. The request typically specifies the precise range of keys for which key-value pairs are desired, and may be in a format of a starting point and a size, e.g., one hundred key starting from 1, meaning keys 1-100. In the example of FIG. 5, the range of keys may be confined to nodes, 1, 2, 3, 6 and 7. Other ranges of keys may span different nodes with the tree of FIG. 5.

Also prior to operations 400, a fractional size of the range of keys may be determined. In some embodiments, the fractional size is based on a number of key-value pairs that fit within system memory of a computing system performing the range lookup. The fractional size may be determined by dividing the range of keys into a plurality of sections. For example, if the range of keys includes one hundred keys, the fractional size may be twenty-five keys, making four sections. Other partial sections of the range of keys are possible. Attempting to transfer the all key-value pairs within the range of keys at once, for very large ranges, may be an inefficient process due to memory restraints of the computing system performing the range lookup. Additionally, by transferring the key-value pairs within the range of keys in smaller sections, the complete range may be identified more quickly, saving processing time on performing additional transfers of key-value pairs.

At 410 key-value pairs are obtained from one or more buffers of one or more nodes at a level of the $B^\varepsilon$-tree and a set of key-value pairs are transferred to a result data structure distinct from the $B^\varepsilon$-tree. The key-value pairs obtained have keys within the range of keys and the set of key-value pairs has a size (i.e., number of key-value pairs) less than (e.g., if there are not sufficient key-value pairs within the range) or equal to the fractional size previously determined. Initially, the key-value pairs may be obtained from the top-level (i.e., root) of the $B^\varepsilon$-tree. In some embodiments the result data structure may be a B-tree while in other embodiments the result data structure may be an array. In general the result data structure may be any data structure capable of storing key-value pairs obtained from the $B^\varepsilon$-tree and being sorted. In the example, of FIG. 5, the key-value pairs initially obtained are from node 1.

As discussed, the key-value pairs (e.g., messages) in the buffers of the $B^\varepsilon$-tree are sorted both by key and time of entry of the key-value pairs. Accordingly, in certain embodiments, key-value pairs obtained from buffer(s) at the level of the $B^\varepsilon$-tree are obtained by order of time entry of the key-value pairs and by order of key. For purposes of illustration, key-value pairs in buffer(s) may be represented as $X_Y$ where X represents the key of the key-value pairs, and Y represents a relative time of entry (a higher number being later) of the key-value pair with respect to other key-value pairs having that key in buffer(s) at the level. For example, buffer(s) at a level of the $B^\varepsilon$-tree may have the following key-value pairs $5_3, 5_2, 5_1, 6_3, 6_2, 7_3, 7_2$, etc. Accordingly, the key-value pairs may be obtained in that order from the buffer(s) at the level of the $B^\varepsilon$-tree.

In certain embodiments, certain key-value pairs within the range of keys in buffer(s) at the level of the $B^\varepsilon$-tree may be skipped and not transferred to the result data structure. For example, for a given key, key-value pairs are obtained in order of time entry. If a later entered key-value pair for the given key indicates an insertion, deletion, or a modification of a key-value pair to a fixed value (e.g., set value to Z), then any previous entered key-value pair for the given key has no bearing on the resulting key-value pair and can safely be skipped over and not transferred to the result data structure.

In certain embodiments, while key-value pairs are inserted in the result data structure, if there are still additional key-value pairs within the range of keys in the one or more buffers at the level, information indicating that there are additional key-value pairs within the range of keys in the one or more buffers at the level is maintained. For example, the information may be stored as an indicator along with the last key-value pair stored in the result data structure from the level. In the example of FIG. 5, if additional key-value pairs within the range of keys remain in the buffer of node 1, an indicator may be left associated with node 1.

At 420, it is determined if there are additional levels of the B$^\varepsilon$-tree. If at 420 it is determined there are additional levels, then the operations 400 return to 410 where the next level (e.g., level with child nodes of the one or more nodes of the previous level) in order is accessed. If at 420 it is determined there are no additional levels, then the operations 400 continue to 430. In FIG. 5, the key-value pairs are initially obtained from node 1. Key-value pairs are then obtained from the next level, which in example of FIG. 5 includes nodes 2 and 3. After key-value pairs are obtained from the second level, key-value pairs may be obtained from the third and final level, including nodes 6 and 7.

At 430 the key-value pairs from each of the levels are sorted together in the result data structure. If the result data structure is a B-tree, transferring the key-value pairs to the B-tree as discussed with respect to 420 may also involve sorting the key-value pairs as they are transferred. If the result data structure is an array, the array may be sorted using merge sort, in-place merge sort, quicksort or any other suitable array sorting algorithm. The key-value pairs may be sorted by key and time of entry of the key-value pairs.

At 440, merging/compacting of all the key-value pairs in the sorted result data structure for a given key in the range of keys begins. The given key may be selected in order from the range of keys (e.g., from lowest to highest). At 450, during the merging, it is determined if for the given key, any of the key-value pairs includes an associated indicator (as discussed with respect to 410) (e.g., determined as it is merged).

If at 450, no indicator is found for the given key, then the resulting merged key-value pair is the key-value pair for the given key. Operations 400 then proceed to 460 where it is determined if any additional keys are within the range of keys. If at 460 it is determined there are additional keys in the range of keys, operations 400 return to 440, where key-value pairs with a next key are merged. If at 460 it is determined there are no additional keys in the range of keys, operations 400 end.

If at 450, an indicator is found for the given key, then at 470, additional key-value pairs are obtained from the one or more buffers of the one or more nodes at the level of the B$^\varepsilon$-tree the indicator is associated with and a set of key-value pairs are transferred to the result data structure. In the example of FIG. 5, if an indicator is found associated with a key-value pair obtained from node 1, node 1 may be accessed again to obtain additional key-value pairs from the buffer of node 1. For example, 470 may be performed similar to 410. The number of the set of key-value pairs transferred may be the same as for 410. Operations 400 then return to 430.

Accordingly, all key-value pairs for the keys within the range of keys that are in the B$^\varepsilon$-tree are merged to get the resulting key-value pair for each key.

FIG. 5 is a block diagram depicting a range lookup performed on B$^\varepsilon$-tree 500. As illustrated, for B$^\varepsilon$-tree 500 an initial step of the range lookup can be roughly divided into three steps 501-503, for each of the three levels of B$^\varepsilon$-tree 500. Generally, a range lookup begins when a request to return key-value pairs within a range of keys is received. At 501, a root node of B$^\varepsilon$-tree 500, here, node 1, is accessed. The buffer of node 1 is examined to locate any key-value pairs stored in the buffer that are within the range of keys.

For a sufficiently large range of keys it may be efficient to divide the transfer of key-value pairs from the buffers of the B$^\varepsilon$-tree to a return data structure. If so, a fractional size of key-value pairs is determined. In this example, key-value pairs within the range of key from the buffer of node 1 are transferred in a set of the same size as the fractional size. When sets of key-value pairs are transferred from a buffer to the return data structure, they are sorted into the return data structure. Transferred sets may be sorted during transfer or after transfer.

At 502, nodes at the next level of the B$^\varepsilon$-tree are accessed. In particular, a child of the node initially accessed node is accessed. For a second level of the B$^\varepsilon$-tree, all nodes are child nodes for the root node. At further levels, only parts of the level may be child nodes of the node or nodes accessed at a previous level. In general, the node accessed at 502 is a node which is itself a root node for a subtree that contains key-value pairs within the range of keys within buffers of the subtree. In this example, buffers of the subtree rooted at node 2 (node 2, node 6 and node 7) and buffers of the subtree rooted at node 3 (node 3 and node 8) contain key-value pairs within the range of keys sought in the range lookup. Similarly to the root node, buffers of nodes 2 and 3 are searched for key-value pairs within the range of keys. Any key-value pairs within the range of keys found are transferred and merged in sets to the return data structure. At 503 the same process is carried out for node 6, and node 7, which are child nodes of node 2 including key-value pairs within the range of keys and is also carried out for node 8, which is a child node of node 3.

During any of steps 501-503, a set of key-value pairs may be transferred from a buffer of a node to the result data structure but additional key-value pairs within the range of keys may remain in the buffer of the node. If so, an indicator may be stored with the last of the key-value pairs transferred. Afterwards, the indicator may be used to determine that additional key-value pairs may be transferred. For example, if an indicator is left in the result data structure with respect to node 2, the range lookup may not be completed until additional key-value pairs are obtained from node 2.

Figure 6:
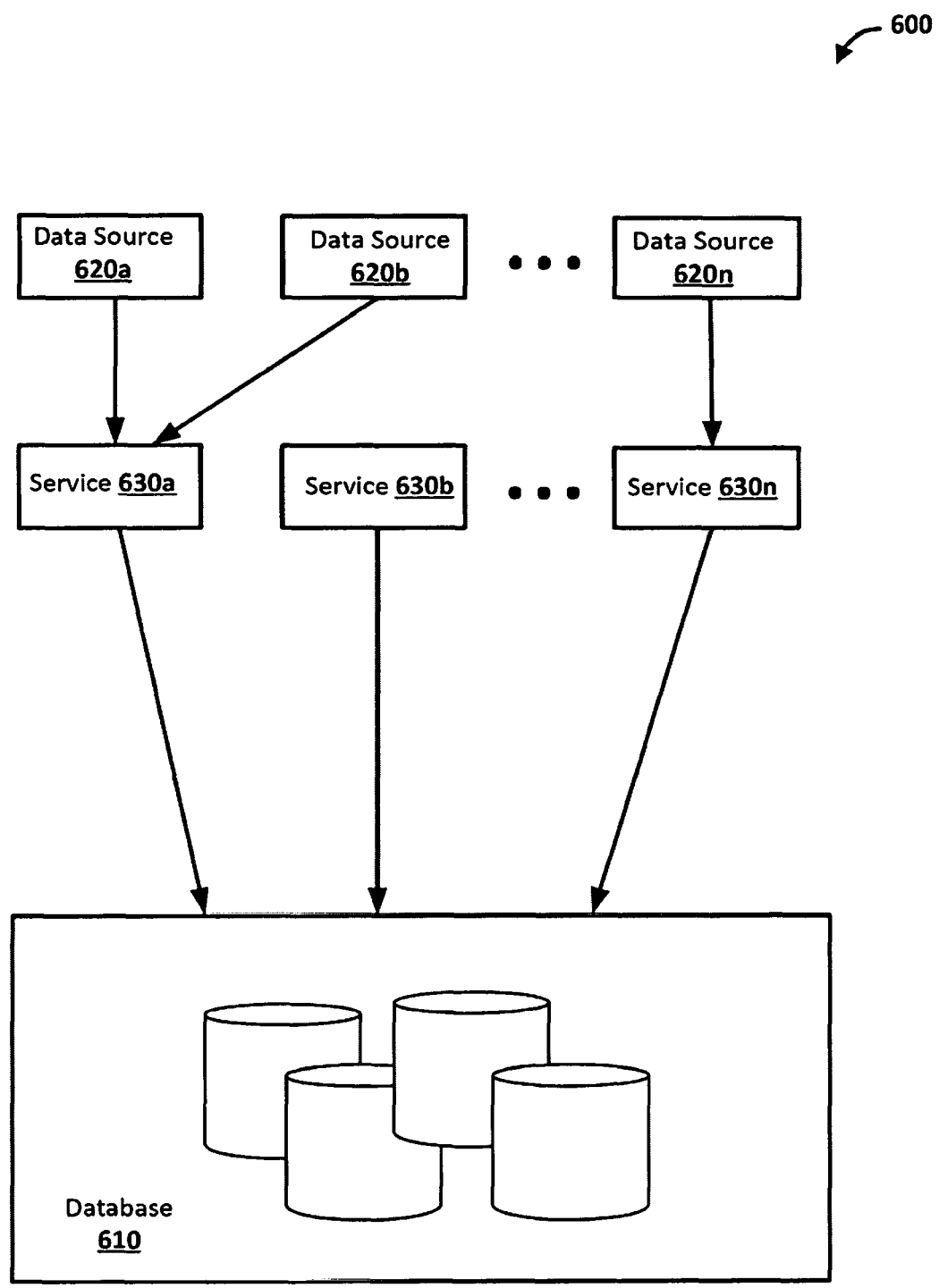
FIG. 6 illustrates components of an example system in which an embodiment may be implemented.

FIG. 6 illustrates components of a system 600 in which an embodiment may be implemented. As shown, system 600 includes a database 610, multiple data sources 620 (e.g., data sources 620*a*, 620*b*, . . . 620*n*), and multiple database management services 630 (e.g., database management services 630*a*, 630*b*, . . . 630*n*). Though multiple data sources 620 and multiple database management services 630 are shown, it should be noted that there may be any number of data sources or database management services in system 600.

Database 610 may include any suitable non-volatile data store for organizing and storing data from the multiple data sources 620. For example, in some embodiments, database 610 may be implemented as software-defined storage such as VMware vSAN that clusters together server-attached hard disks and/or solid state drives (HDDs and/or SSDs), to create a flash-optimized, highly resilient shared datastore designed for virtual environments. In some embodiments, database 610 may be implemented as one or more storage devices, for example, one or more hard disks, flash memory modules, solid state disks, and optical disks (e.g., in a computing device, server, etc.). In some embodiments, database 610 may include a shared storage system having one or more storage arrays of any type such as a network-attached storage (NAS) or a block-based device over a storage area network (SAN). Database 610 may store data from one or more data sources 620 in a B$^\varepsilon$-tree structure as discussed.

Each data source 620 may correspond to one or more physical devices (e.g., servers, computing devices, etc.) or virtual devices (e.g., virtual computing instances, containers, virtual machines (VMs), etc.). For example, a physical device may include hardware such as one or more central processing units, memory, storage, and physical network interface controllers (PNICs). A virtual device may be a device that represents a complete system with processors, memory, networking, storage, and/or BIOS, that runs on a physical device. For example, the physical device may execute a virtualization layer that abstracts processor, memory, storage, and/or networking resources of the physical device into one more virtual devices. Each data source 620 may generate data that is loaded into database 610. Each data source 620 may request operations to be performed on the database 610, such as a range lookup as discussed.

Each database management service 630 may be a process or application executing on one or more physical devices or virtual devices. In certain embodiments, a database management service 630 may execute on the same device as a data source 620. In certain embodiments, a database management service 630 may execute on a separate device from the data source 620. A database management service 630 may be an automatic service, or a manual service (e.g., directed by a human).

Each database management service 630 may be coupled (e.g., via a network, as running on the same device, etc.) to one or more data sources 620 and to the database 610 (e.g., via a network). Further, each database management service 630 may be configured to generate and perform operations on database 610. For example, a given data source 620 may send a range lookup request for a range of keys in database 610 to a database management service 630. Database 610 may be implemented as a $B^\varepsilon$-tree as discussed above. The database management service 630 may perform the range lookup on database 610 as discussed above.

The various embodiments described herein may employ various computer-implemented operations involving data stored in computer systems. For example, these operations may require physical manipulation of physical quantities— usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system— computer readable media may be based on any existing or subsequently developed technology for embodying computer programs in a manner that enables them to be read by a computer. Examples of a computer readable medium include a hard drive, network attached storage (NAS), read-only memory, random-access memory, a flash memory device, a NVMe device, a non-volatile memory device, a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for performing a range lookup in a $B^\varepsilon$-tree, comprising:

receiving a request to return key-value pairs within a range of keys from the $B^\varepsilon$-tree, wherein the $B^\varepsilon$-tree comprises a plurality of nodes comprising a root node, a plurality of branch nodes, and a plurality of leaf nodes, wherein the root node and each node of the plurality of branch nodes is associated with a buffer that stores one or more key-value pairs;

obtaining from within one or more buffers of one or more nodes of at least one level of the $B^\varepsilon$-tree, a set of key-value pairs within the range of keys up to a size equal to a size limit, the set of key value pairs comprising less than all key-value pairs within the range of keys stored in the $B^\varepsilon$-tree;

transferring the set of key-value pairs to a result data structure;

after the transferring the set of key-value pairs, sorting all key-value pairs in the result data structure;

after the transferring the set of key-value pairs, merging all key value pairs in the result data structure for at least one key of the range of keys;

after the merging, determining that at least one key-value pair for the at least one key remains in the one or more buffers of the one or more nodes of the at least one level;

after the determining, obtaining from within the one or more buffers of the one or more nodes of the at least one level one or more additional key-value pairs within the range of keys;

transferring the one or more additional key-value pairs to the result data structure;

after the transferring the one or more additional key value pairs, sorting all key-value pairs in the result data structure;

after the transferring the one or more additional key value pairs, merging all key value pairs in the result data structure for the at least one key of the range of keys; and returning the result data structure in response to the request.

2. The method of claim 1, wherein the result data structure is one of a B-tree or an array.

3. The method of claim 1, further comprising determining the size limit by dividing the range of keys into a plurality of sections based on a number of key-value pairs that fit within a system memory, wherein the size limit is a size of a section of the plurality of sections.

4. The method of claim 1, wherein the $B^\epsilon$-tree is locked during performing a range lookup to prevent modifications of the $B^\epsilon$-tree.

5. The method of claim 1, wherein obtaining the set of key-value pairs comprises:
 determining a first key-value pair within the one or more buffers of the one or more nodes associated with a particular key of the range of keys is one of:
  a delete message;
  an insert message; or
  a modification of a value associated with the particular key to a fixed value; and
 not including in the set of key-value pairs any key-value pairs associated with the particular key having an earlier ordering than the first key-value pair.

6. The method of claim 1, further comprising:
 storing an indicator in the result data structure indicating key-value pairs within the range of keys have not been fully transferred from the at least one level.

7. The method of claim 6, wherein determining that at least one key-value pair for the at least one key remains in the one or more buffers of the one or more nodes of the at least one level comprises:
 determining that the indicator is stored within the result data structure associated with a first key-value pair of the at least one key-value pair.

8. A computer system, wherein system software for the computer system is programmed to execute a method for performing a range lookup in a $B^\epsilon$-tree, the method comprising:
 receiving a request to return key-value pairs within a range of keys from the $B^\epsilon$-tree, wherein the $B^\epsilon$-tree comprises a plurality of nodes comprising a root node, a plurality of branch nodes, and a plurality of leaf nodes, wherein the root node and each node of the plurality of branch nodes is associated with a buffer that stores one or more key-value pairs;

obtaining from within one or more buffers of one or more nodes of at least one level of the $B^\epsilon$-tree, a set of key-value pairs within the range of keys up to a size equal to a size limit, the set of key value pairs comprising less than all key-value pairs within the range of keys stored in the $B^\epsilon$-tree;

transferring the set of key-value pairs to a result data structure;

after the transferring the set of key-value pairs, sorting all key-value pairs in the result data structure;

after the transferring the set of key-value pairs, merging all key value pairs in the result data structure for at least one key of the range of keys;

after the merging, determining that at least one key-value pair for the at least one key remains in the one or more buffers of the one or more nodes of the at least one level;

after the determining, obtaining from within the one or more buffers of the one or more nodes of the at least one level one or more additional key-value pairs within the range of keys;

transferring the one or more additional key-value pairs to the result data structure;

after the transferring the one or more additional key value pairs, sorting all key-value pairs in the result data structure;

after the transferring the one or more additional key value pairs, merging all key value pairs in the result data structure for the at least one key of the range of keys; and returning the result data structure in response to the request.

9. The computer system of claim 8, wherein the result data structure is one of a B-tree or an array.

10. The computer system of claim 8, wherein the method further comprises determining the size limit by dividing the range of keys into a plurality of sections based on a number of key-value pairs that fit within a system memory, wherein the size limit is a size of a section of the plurality of sections.

11. The computer system of claim 8, wherein the $B^\epsilon$-tree is locked during performing a range lookup to prevent modifications of the $B^\epsilon$-tree.

12. The computer system of claim 8 wherein obtaining the set of key-value pairs comprises:
 determining a first key-value pair within the one or more buffers of the one or more nodes associated with a particular key of the range of keys is one of:
  a delete message;
  an insert message; or
  a modification of a value associated with the particular key to a fixed value; and
 not including in the set of key-value pairs any key-value pairs associated with the particular key having an earlier ordering than the first key-value pair.

13. The computer system of claim 8, the method further comprising:
 storing an indicator in the result data structure indicating key-value pairs within the range of keys have not been fully transferred from the at least one level.

14. The computer system of claim 13, wherein determining that at least one key-value pair for the at least one key remains in the one or more buffers of the one or more nodes of the at least one level comprises:

determining that the indicator is stored within the result data structure associated with a first key-value pair of the at least one key-value pair.

15. A non-transitory computer readable medium comprising instructions to be executed in a computer system, wherein the instructions when executed in the computer system cause the computer system to perform a method for performing a range lookup in a $B^\varepsilon$-tree, the method comprising:

receiving a request to return key-value pairs within a range of keys from the $B^\varepsilon$-tree, wherein the $B^\varepsilon$-tree comprises a plurality of nodes comprising a root node, a plurality of branch nodes, and a plurality of leaf nodes, wherein the root node and each node of the plurality of branch nodes is associated with a buffer that stores one or more key-value pairs;

obtaining from within one or more buffers of one or more nodes of at least one level of the $B^\varepsilon$-tree, a set of key-value pairs within the range of keys up to a size equal to a size limit, the set of key value pairs comprising less than all key-value pairs within the range of keys stored in the $B^\varepsilon$-tree;

transferring the set of key-value pairs to a result data structure;

after the transferring the set of key-value pairs, sorting all key-value pairs in the result data structure;

after the transferring the set of key-value pairs, merging all key value pairs in the result data structure for at least one key of the range of keys;

after the merging, determining that at least one key-value pair for the at least one key remains in the one or more buffers of the one or more nodes of the at least one level;

after the determining, obtaining from within the one or more buffers of the one or more nodes of the at least one level one or more additional key-value pairs within the range of keys;

transferring the one or more additional key-value pairs to the result data structure;

after the transferring the one or more additional key value pairs, sorting all key-value pairs in the result data structure;

after the transferring the one or more additional key value pairs, merging all key value pairs in the result data structure for the at least one key of the range of keys; and returning the result data structure in response to the request.

16. The non-transitory computer readable medium of claim 15, wherein the result data structure is one of a B-tree or an array.

17. The non-transitory computer readable medium of claim 15, wherein the $B^\varepsilon$-tree is locked during performing a range lookup to prevent modifications of the $B^\varepsilon$-tree.

18. The non-transitory computer readable medium of claim 15, wherein obtaining the set of key-value pairs comprises:

determining a first key-value pair within the one or more buffers of the one or more nodes associated with a particular key of the range of keys is one of:

a delete message;

an insert message; or a modification of a value associated with the particular key to a fixed value; and not including in the set of key-value pairs any key-value pairs associated with the particular key having an earlier ordering than the first key-value pair.

19. The non-transitory computer readable medium of claim 17, the method further comprising:

storing an indicator in the result data structure indicating key-value pairs within the range of keys have not been fully transferred from the at least one level.

20. The non-transitory computer readable medium of claim 17, wherein determining that at least one key-value pair for the at least one key remains in the one or more buffers of the one or more nodes of the at least one level comprises:

determining that the indicator is stored within the result data structure associated with a first key-value pair of the at least one key-value pair.

* * * * *